UNITED STATES PATENT OFFICE.

KARL THIESS, OF SINDLINGEN, NEAR HOCHST-ON-THE-MAIN, AND FRITZ MAENN-CHEN, ADOLF STEINDORFF, AND FRANZ GILOY, OF HOCHST-ON-THE-MAIN, GERMANY, ASSIGNORS TO FARBWERKE VORM. MEISTER LUCIUS & BRUNING, OF HOCHST-ON-THE-MAIN, GERMANY, A CORPORATION OF GERMANY.

STABLE, DRY, AND READILY-SOLUBLE VAT PREPARATIONS AND PROCESS OF MAKING SAME.

1,426,522.     Specification of Letters Patent.     Patented Aug. 22, 1922.

No Drawing.     Application filed August 23, 1921. Serial No. 494,714.

*To all whom it may concern:*

Be it known that we, KARL THIESS, FRITZ MAENNCHEN, ADOLF STEINDORFF, and FRANZ GILOY, citizens of Germany, residing at Sindlingen, near Hochst-on-the-Main, and Hochst-on-the-Main, Germany, have invented certain new and useful Improvements in Stable, Dry, and Readily-Soluble Vat Preparations and Processes of Making Same, of which the following is a specification.

Processes are known for preparing dry alkali salts of indigo-white in the form of small loose and frothy, somewhat vesicular, stable and readily soluble lumps, with or without the addition of agglutinating bodies, such as molasses, sugar or sulphite-cellulose pitch. However, when applying these processes to the manufacture of vat preparations from the sulphurized or non-sulphurized quinon-vat dyestuffs dying wool, the preparations thus obtained have defective qualities. Such quinone-dyestuffs are in particular (1) the sulphurized products obtainable either according to U. S. Patent No. 1,128,368 of February 16, 1915, from halogenized quinones and arylamines or the substitution products (such as chloro- or nitro-arylamines) by treatment with sulphur, or from quinonethiosulphonic acids or bodies of similar action and arylamines. (1) the non-sulphurized products such as, for instance, the arylido-quinones which can be used as vat dyestuffs (see U. S. Patent No. 1,009,981 of November 28, 1911.) However, as above mentioned, the vat-preparations made from these dyestuffs do not give satisfactory results in practice, as they have not the great solubility and porosity characteristic of the corresponding vat preparation from indigo. Moreover, the aforesaid products can only be dried with great difficulty and, when dry, they tend to agglomerate. Finally the dyestuff as such suffers when it is evaporated and dried so that it loses in its yield and intensity of colour.

By our present invention the aforesaid disadvantages can be avoided by adding a larger or smaller proportion of an alkali-salt of indigo-white. If, for instance, a mixture of equal parts of a leuco-compound of a brown sulphurized quinone vat-dyestuff obtainable for instance according to Example 1 of U. S. Patent 1,128,368 of February 16, 1915 and of a leuco-compound of of indigo, or a corresponding proportion of a mixture containing a smaller or larger amount of an alkali salt of indigo-white, is evaporated, preferably in a vacuum, and inflated according to the said processes, with or without the addition of agglutinating or diluting bodies, there are obtained porous vat-preparations which are readily soluble and in which no colouring matter has been lost. These preparations can scarcely be distinguished externally from the corresponding indigo vat-preparations and they are just as stable as are the preparations for the simple indigo vat.

The following examples illustrate the invention:—

1. There are mixed and stirred in leuco-form 225 kilos of indigo and 75 kilos of the dyestuff obtained by treating di-chloranilido-quinone with sodium sulphide according to U. S. Patent No. 1,128,368 of February 16, 1915, with 290 kilos of caustic soda lye of 40° Baumé specific gravity, 50 kilos of molasses or 30 kilos of sulphite-cellulose pitch and 30 kilos of commercial hydrosulphite, the latter dissolved in 300 kilos of water. The paste or liquid thus obtained is evaporated in a vacuum to dryness so as to assume a solid porous form. The vat-preparation thus obtained is of a loose and frothy, somewhat vesicular nature and shows a dark lustre. It is extremely stable and readily soluble in water yielding a vat ready for use which dyes wool black tints.

2. There is prepared a paste of about 20 per cent strength from the leuco-compound of 180 kilos of indigo and 180 kilos of the sulphurized quinone vat-dyestuff obtainable according to U. S. Patent No. 1,128,368 of February 16, 1915. This paste is mixed and stirred with 330 kilos of caustic soda lye of 40° Baumé specific gravity, 300 kilos of water, 40 kilos of molasses and 30 kilos of hydrosulphit powder and the mixture is evaporated to dryness. The product thus obtained is equal to that described in Example 1 as regards its aspect and solubility.

3. There is prepared a paste from the leuco-compounds of 125 kilos of indigo and 250 kilos of para-para$^1$-dichloro-dianilidoquinone. This paste is mixed with a solution of 300 kilos of caustic soda lye of 40° Baumé specific gravity, 60 kilos of molasses (50 per cent strength) and 30 kilos of commercial hydrosulphite in 400 kilos of water and the whole is evaporated to dryness. The product thus obtained is of a loose and frothy, somewhat vesicular nature and has a dark lustre; it is readily soluble in water yielding a vat which dyes wool green and greenish-blue tints.

If for the brown dyestuff in Examples 1 and 2 or for the yellow dyeing para-para$^1$-dichloro-dianilidoquinone in Example 3 is substituted the yellow dyestuff described in U. S. Patent No. 1,128,368 and No. 1,151,628, corresponding vat-preparations are obtained of a solid frothy, somewhat vesicular nature which dye wool mixed tints.

Having now described our invention, what we claim is:

1. As a new process, the herein described manufacture of stable, dry and readily soluble vat-preparations from quinone vat dyestuffs for wool and indigo, which comprises evaporating to dryness an aqueous mixture of an alkali leuco-salt of the quinone vat dyestuffs and an alkali salt of leuco indigo.

2. As a new process, the herein described manufacture of stable, dry and readily soluble vat preparations from quinone vat dyestuffs for wool and indigo, which comprises evaporating to dryness an aqueous mixture of an alkali leuco-salt of the quinone vat dye-stuffs and an alkali salt of leuco indigo and an agglutinating or diluting agent.

3. As a new process, the herein described manufacture of stable, dry and readily soluble vat-preparations from quinone vat dyestuffs for wool and indigo, which comprises evaporating in a vacuum to dryness an aqueous mixture of an alkali leuco-salt of the quinone vat dyestuffs and an alkali salt of leuco indigo.

4. As a new process, the herein described manufacture of stable, dry and readily soluble vat preparations from quinone vat dyestuffs for wool and indigo, which comprises evaporating in a vacuum to dryness an aqueous mixture of an alkali leuco-salt of the quinone vat dyestuffs and an alkali salt of leuco indigo and an agglutinating or diluting agent.

5. As new products, vat preparations from quinone vat dyestuffs for wool and indigo, which preparations contain an alkali leuco-salt of said quinone vat-dyestuffs together with an alkali salt of leuco-indigo and are stable, dry and readily soluble.

6. As new products, vat preparations from quinone vat dyestuffs for wool and indigo, which preparations contain an alkali leuco-salt of said quinone vat-dyestuffs together with an alkali salt of leuco-indigo and an agglutinating or diluting agent, and which are stable, dry and readily soluble.

In testimony whereof, we affix our signatures.

KARL THIESS.
FRITZ MAENNCHEN.
ADOLF STEINDORFF.
FRANZ GILOY.